United States Patent
Augstein et al.

(10) Patent No.: US 7,334,405 B2
(45) Date of Patent: Feb. 26, 2008

(54) METHOD OF CONTROLLING AN EXHAUST GAS TURBOCHARGER

(75) Inventors: Joachim Augstein, Steinheim/Murr (DE); Marcus Reissing, Schorndorf (DE); Roland Weik, Cleversulzbach (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 11/474,917

(22) Filed: Jun. 21, 2006

(65) Prior Publication Data

US 2006/0271267 A1 Nov. 30, 2006

Related U.S. Application Data

(63) Continuation-in-part of application No. PCT/EP2004/014557, filed on Dec. 22, 2004.

(30) Foreign Application Priority Data

Dec. 22, 2003 (DE) .................................. 103 61 114

(51) Int. Cl.
  *F02B 33/44* (2006.01)
  *F02B 37/00* (2006.01)
  *F02B 37/12* (2006.01)
  *F02D 23/00* (2006.01)

(52) U.S. Cl. ..................... 60/612; 60/605.1; 123/562; 701/100

(58) Field of Classification Search .................. 60/612, 60/605.1; 123/562; 700/100, 108; F02B 37/00, F02B 37/12
See application file for complete search history.

(56) References Cited

U.S. PATENT DOCUMENTS

| | | | | | |
|---|---|---|---|---|---|
| 2,199,259 | A | * | 4/1940 | Hersey ........................ | 60/612 |
| 2,359,615 | A | * | 10/1944 | Browne et al. ............... | 60/612 |
| 4,299,090 | A | * | 11/1981 | Deutschmann ............... | 60/612 |
| 4,388,802 | A | * | 6/1983 | Dinger et al. ................. | 60/612 |
| 4,422,296 | A | * | 12/1983 | Dinger et al. ................. | 60/612 |
| 4,428,192 | A | * | 1/1984 | Dinger et al. ................. | 60/612 |
| 4,538,574 | A | * | 9/1985 | Lombardi .................... | 60/612 |
| 4,548,039 | A | * | 10/1985 | Dinger et al. ................. | 60/612 |
| 4,698,765 | A | * | 10/1987 | Abe et al. .................... | 701/102 |
| 4,781,027 | A | * | 11/1988 | Richter et al. ................ | 60/612 |
| 4,903,489 | A | * | 2/1990 | Ruetz .......................... | 60/612 |
| 6,253,551 | B1 | * | 7/2001 | Lohmann et al. ............. | 60/612 |
| 7,066,157 | B2 | * | 6/2006 | Takahashi et al. ............ | 60/612 |

(Continued)

FOREIGN PATENT DOCUMENTS

DE 42 13 047 10/1993

(Continued)

*Primary Examiner*—Thai-Ba Trieu
(74) *Attorney, Agent, or Firm*—Klaus J. Bach

(57) ABSTRACT

In a method of controlling an exhaust gas turbocharger of an internal combustion engine charged by a compressor wherein as guide value for the control an operating point of the compressor is used, the operation of each cylinder bank of the internal combustion engine is controlled by dividing the total air mass flow by the number of cylinder banks and an equal amount of desired air mass flow is assigned to each cylinder bank and if the air mass flow to any of the cylinder banks is smaller than that to the other or others air from the other cylinder bank or banks is supplied to the one cylinder bank via a compensation arrangement so that the air mass flows to all cylinder banks are essentially equal.

5 Claims, 8 Drawing Sheets

U.S. PATENT DOCUMENTS

2006/0117751 A1* 6/2006 Todoroki et al. ............. 60/612
2007/0163258 A1* 7/2007 Narita et al. ................. 60/612

FOREIGN PATENT DOCUMENTS

| | | |
|---|---|---|
| DE | 001 097 | 10/1996 |
| DE | 100 62 350 | 6/2002 |
| DE | 102 24 686 | 12/2003 |
| JP | 05005420 A * | 1/1993 |
| JP | 2001 329849 | 11/2001 |

* cited by examiner

METHOD OF CONTROLLING AN EXHAUST GAS TURBOCHARGER

This is a Continuation-In-Part Application of International Application PCT/EP2004/014557 filed Dec. 22, 2004 and claiming the priority of German Application 103 61 114.2 filed Dec. 22, 2003.

BACKGROUND OF THE INVENTION

The invention relates to a method of controlling an exhaust gas turbocharger for an internal combustion engine charged by a compressor wherein as guide value for the control, an operating point of the compressor is used.

AT 001 097 U1 discloses a method of controlling an exhaust gas turbocharger with a compressor wherein an operating point of the compressor is used as the guide value for controlling the compressor. During operation of the exhaust gas turbo-charger, the exhaust gas turbocharger settings are adjusted until the air mass flow and the pressure ratio correspond to a desired relation, which is stored in a storage device.

JP 2001 329849 A discloses a method of controlling a two-stage charging arrangement wherein the pressure ratio of a compressor of a high pressure stage is determined and is compared with a predetermined desired value. Depending on the comparison a by-pass valve of a turbine of the high pressure stage is controlled until the actual pressure ratio at the compressor corresponds to the predetermined desired value.

DE 100 62 350 A1 discloses a method of controlling a charging arrangement for an internal combustion engine wherein as guide value an air mass flow in the intake duct of the compressor is used. Herein, the control range is divided into at least four partial ranges of different control characteristics depending on the gradient of the value to be controlled and a difference of the value to be controlled from the guide value.

It is the object of the present invention to provide a method of controlling an exhaust gas turbocharger for an internal combustion engine charged by a compressor such that the dynamics of the charging operation are improved.

SUMMARY OF THE INVENTION

In a method of controlling an exhaust gas turbocharger of an internal combustion engine charged by a compressor wherein as guide value for the control an operating point of the compressor is used, the operation of each cylinder bank of the internal combustion engine is controlled by dividing the total air mass flow by the number of cylinder banks and an equal amount of desired air mass flow is assigned to each cylinder bank and if the air mass flow to any of the cylinder banks is smaller than that to the other or others air from the other cylinder bank or banks is supplied to the one cylinder bank via a compensation arrangement so that the air mass flows to all cylinder banks are essentially equal.

Generally, there are two cylinder banks and the desired air mass flows for the two cylinder banks are each limited to the maximally admissible desired air mass flow values. If one of the two cylinder banks is capable of providing only a limited air mass flow, the other cylinder bank provides the desired additional amount unavailable from the one cylinder bank via a bank compensation arrangement. It is advantageous if such a bank compensation arrangement is provided for since the overall cylinder filling degree can be increased in this way when the air mass flow of one cylinder bank is limited and, at the same time, an additional air mass can be accommodated by the other cylinder bank. It is, after all, possible that at higher air mass flows the exhaust gas back pressure of one bank becomes exceedingly high so that filling differences between the two banks will occur. With the operating point control with bank compensation, the overall efficiency in the partial load—and in the full load range—of engine operation can be increased.

Further features and advantages of the invention will become apparent from the following description thereof with reference to the accompanying drawings.

DESCRIPTION OF A PARTICULAR EMBODIMENT OF THE INVENTION

Figure 1:
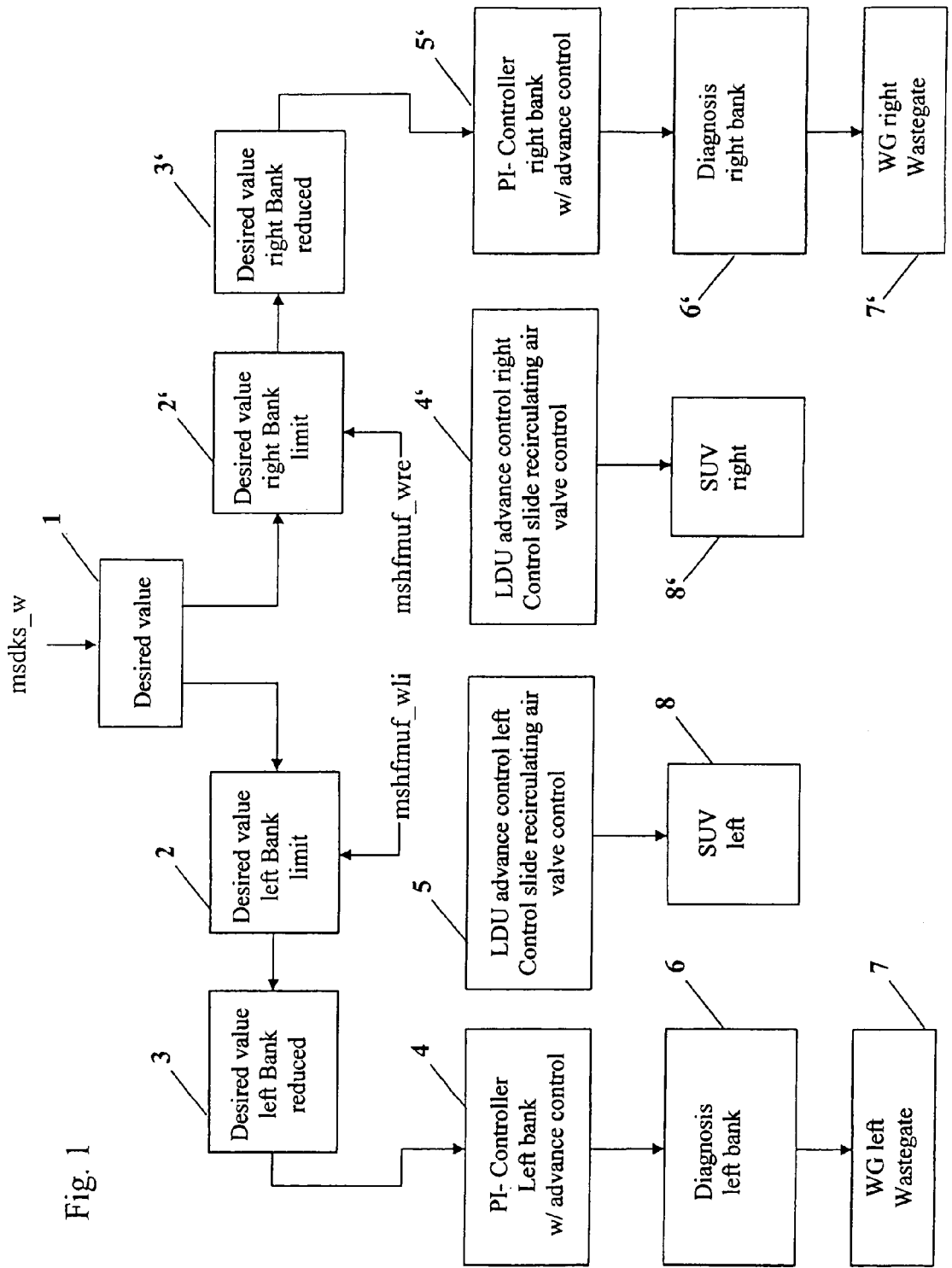
FIG. 1 shows, in principle, the arrangement for the operating point control system for the charging of the cylinder banks of a two-bank internal combustion engine.

The method of controlling an exhaust gas turbocharger shown in FIG. 1 concerns an internal combustion engine with two cylinder banks, each including at least one compressor for the left and the right cylinder bank. Start-out point for the control is the total desired air mass flow msdks_w which is to be supplied to the internal combustion engine. From this value, in block 1 desired values for the air mass flow in each of the left and, respectively, the right cylinder bank are determined and supplied to a second block 2, 2'. Since the structure for the two cylinder banks is identical, generally only the blocks for the left cylinder bank are explained. In the drawing, the blocks for the right cylinder bank are indicated by an apostrophe (').

To the second block 2, a raw value mshfmuf_wli for the actual air mass flow is added. From this input value, a limited desired value is determined in the second block 2. In a subsequent third block 3, this limited desired value is reduced as the case may be. The desired value resulting therefrom is then supplied to a fourth block 4 where the actual value is adjusted using a PI controller with performance graph-based pilot control. Connected to the fourth block 4 is a sixth block 6 with a diagnosis routine and a seventh block 7 with a waste gate control. In parallel therewith, in a fifth block 5, a control including a performance graph-based pilot control value for a slide air valve is determined in an eights block 8 accordingly adjusted.

Figure 2:
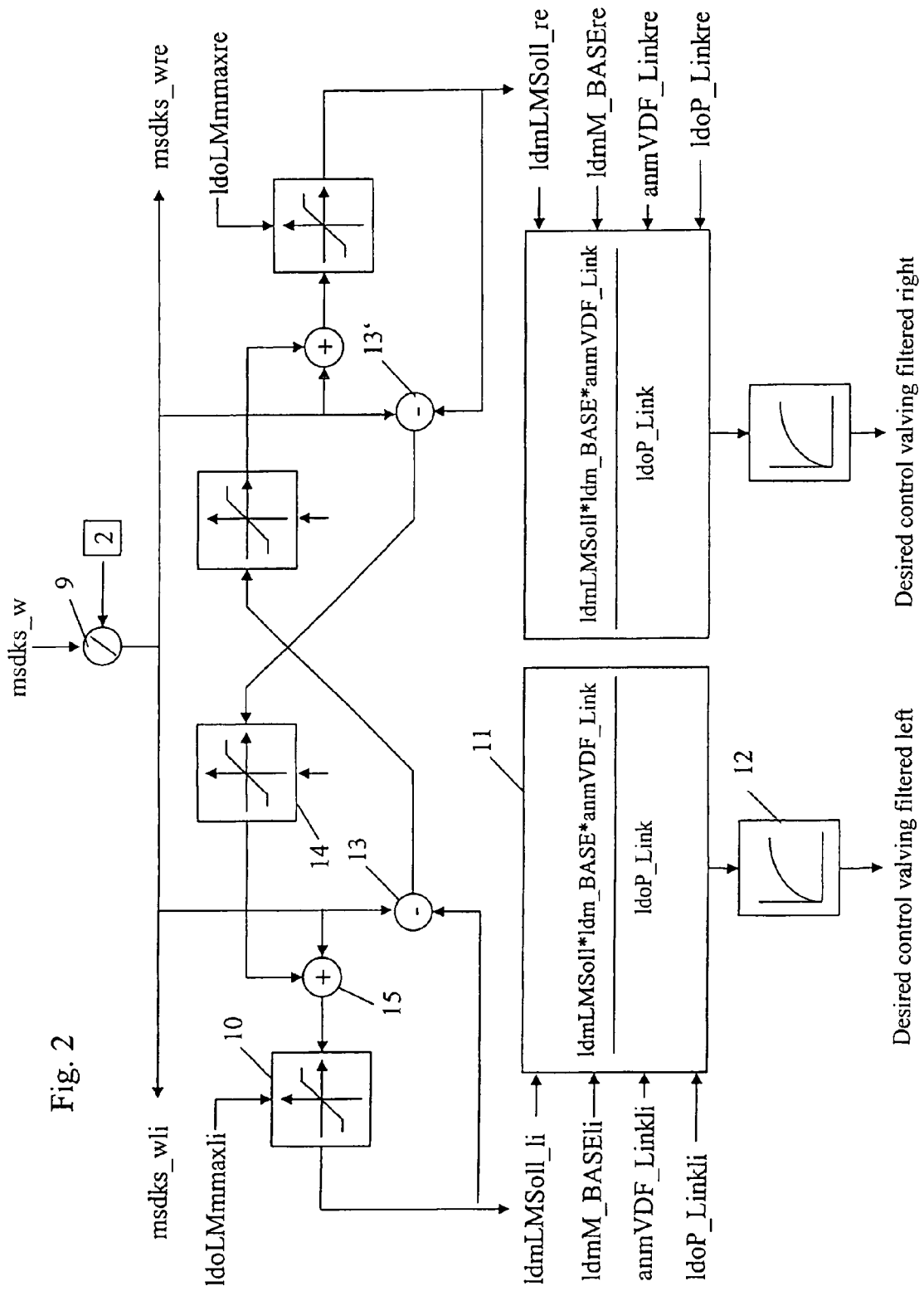
FIG. 2 shows in detail the block 1-3 of FIG. 1.

The content of the blocks 1 to 3 of FIG. 1 is shown in detail in FIG. 2. It concerns the provision of a desired value with cylinder bank compensation. The whole desired air mass flow msdks_w is divided in block 9 by two and in this way the desired air mass flows msdks_wli for the left bank and msdks wre for the right bank are determined. Since the arrangements are also in FIG. 2 identical for both cylinder banks, below, again, only the blocks for the left cylinder bank are explained. The desired air mass flow msdks_wli is supplied, together with an air mass desired value limit ldotMmmaxli to a block 10 which forms a limiter and a limited air mass desired value ldmLMSoll_li for the left bank is determined therefrom. The value for the desired air mass value limit ldoLMmmaxli indicates the maximally admissible air mass and may be stored in a performance graph. This limited desired air mass value ldmLMSoll_li is supplied to a computation block 11 together with a weighting factor for the calculation of a reduced air mass ldmM_BASEli, a corrected suction pressure ahead of the compressor (with pressure loss) anmVDF_Linkli and a corrected charge air pressure after the compressor (with pressure loss) ldoP_Linkli. From the result of the calculation subsequently in block 12, a filter desired control value for the left bank is determined.

For the bank compensation, furthermore, a block 13 is provided in which a difference between the desired air mass flow msdks_wli and the limited desired air mass value ldmLMSoll_li of the left bank is determined. A corresponding block 13' is provided for the right bank. The difference of the right cylinder bank from block 13' is also limited in a block 14 to a maximum value for the air mass transfer between the two banks and subsequently is supplied to a summing block 15. With this bank compensation, an increase of the overall cylinder filling is made possible if, in one cylinder bank, the air mass flow is limited and, at the same time, an additional air mass can be accommodated by the other cylinder bank. This is, because with a higher air mass flow the exhaust gas back pressure in one bank may be excessively high resulting in filling degree differences between the two banks. In order to correct these filling degree imbalances a reduced desired mass flow is provided for the bank with the reduced filling in order to reduce in this way the exhaust gas back pressure. This distribution of the desired mass flow which differs depending on the bank is facilitated, for example, with the aid of a weighting performance graph, which has the effect of increasing the value for one bank while decreasing it for the other.

Figure 3:
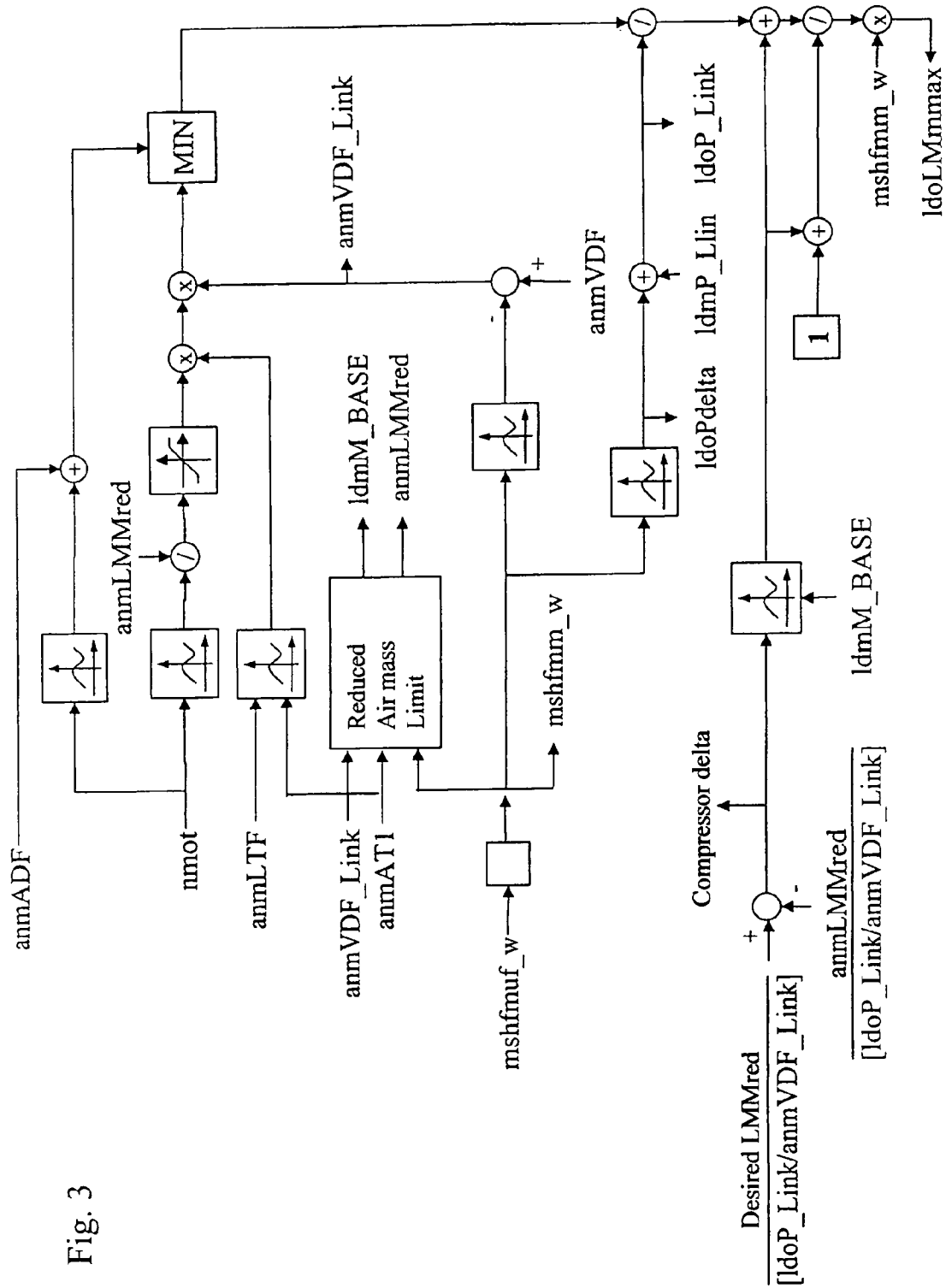
FIG. 3 shows the determination of the desired value limit in detail.

In FIG. 3, the limiting of the desired value according to block 2 of FIG. 1 or, respectively, block 10 of FIG. 2 is shown in greater detail. Herein as input values, the atmospheric pressure anmADF, the engine speed nmot, the charge air temperature after the charge air cooler anmLTF, the corrected intake air pressure before the compressor anmVDF_link (with pressure loss), the intake air temperature anmATI, the row value for the actual air mass mshfmuf_w, as well as the operating point change (compressor delta) are used and the desired air mass limit value IdoLMmmax is calculated therefrom as described on the basis of FIG. 2.

Figure 4:
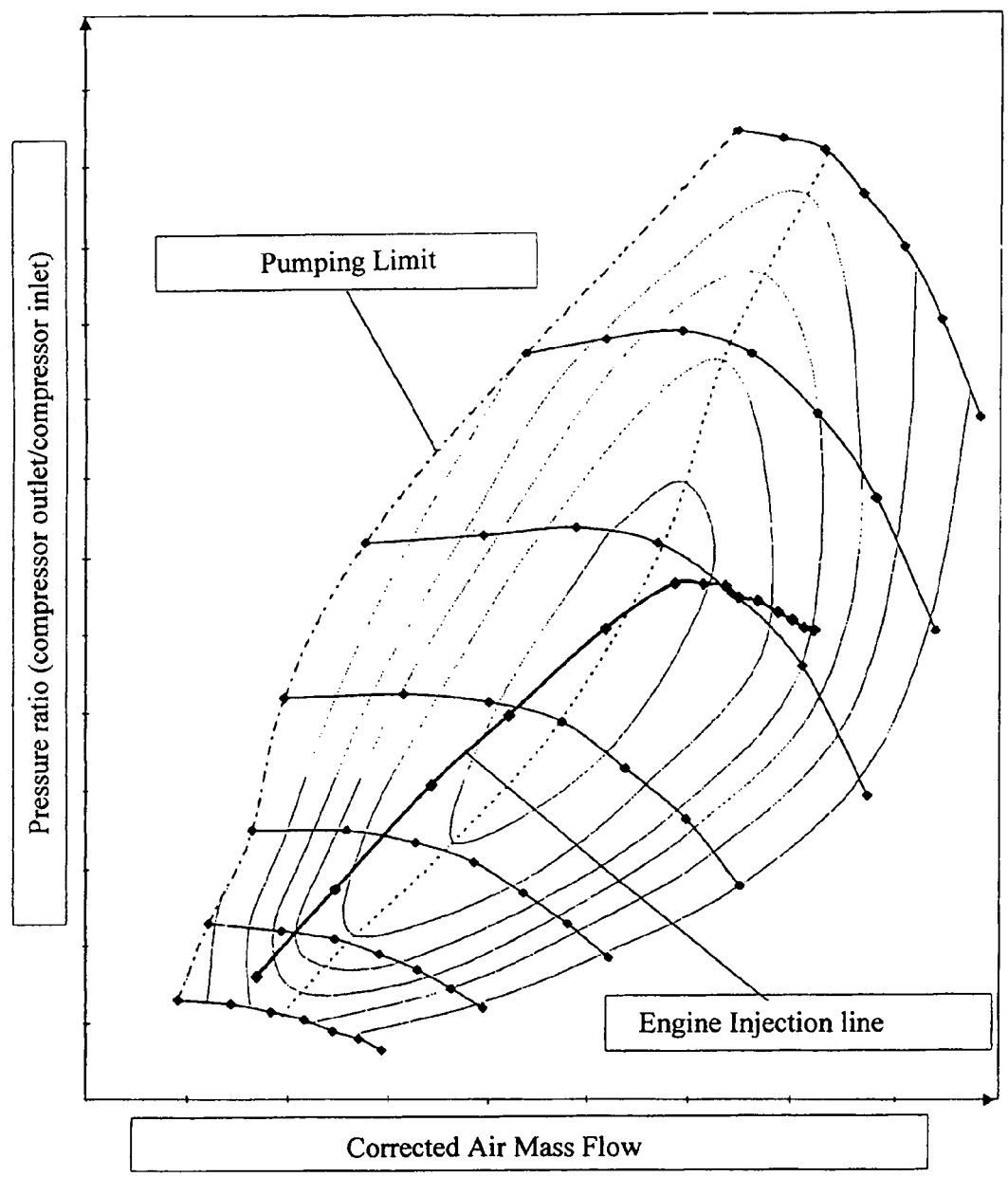
FIG. 4 shows an example of an operating performance graph of a compressor.

FIG. 4 shows an example for a compressor performance graph wherein the pressure ratio P2/P1 is shown over the corrected air mass flow. The dashed-dotted line indicates the pumping limit of the compressor which should not be exceeded during operation. Furthermore, an engine ingestion line is indicated. It indicates, dependent on the engine speed, which air mass flow is required by the internal combustion engine at which pressure ratio of the compressor. In the shown example, the required air mass flow increases with increasing speed. The pressure ratio also increases with increasing speed but drops again at very high speeds.

Based hereon, with a known compressor performance graph and a known engine ingestion line, during engine operation the respective optimal operating point can be predetermined. A change of the load requirements for the internal combustion engine generally leads to a change in the engine speed. For this target speed, again an optimal operating point can be determined on the basis of the engine ingestion line from the compressor performance graph. The difference between the two operating points is used as input value for the control of the exhaust gas turbocharger with performance graph-based pilot control. The actual control of the exhaust gas turbocharger then only needs to correct the deviations of the pre-determined control value from the desired value. In this way, the dynamics and, at the same time, the quality of the control are substantially improved.

As guide value for the control preferably the quotient of the air mass flow and the pressure ratio at the compressor are used, wherein the respective associated mass flows and pressures are corrected with the use of sensors and, if appropriate, with the aid of suitable models.

The PI control with performance graph-based pilot control represented by block 4 in FIG. 1 is described already in DE 100 62 350 and is therefore only shortly discussed herein. In this method, the control range is divided, depending on a gradient of the value to be controlled and a difference of the value to be controlled, into at least four partial ranges of which each has different control characteristics. For example, in the quadrants I and III, in which the value to be controlled has a negative gradient, a generally defensive controller application is provided. With the value to be controlled being positive in the quadrants II and IV, a generally aggressive control application is provided.

With the division of the control range into the quadrants I, II, III and IV, a high dynamic in the charging range of an internal combustion engine and, at the same time, an improved control quality can be achieved. A vehicle accordingly reacts spontaneously to a gas pedal position change by the driver. No undesirable delay that is a so-called turbo-lag occurs. At the same time, the internal combustion engine is reliably protected by the improved control quality from unacceptably high combustion chamber pressures.

Figure 5:
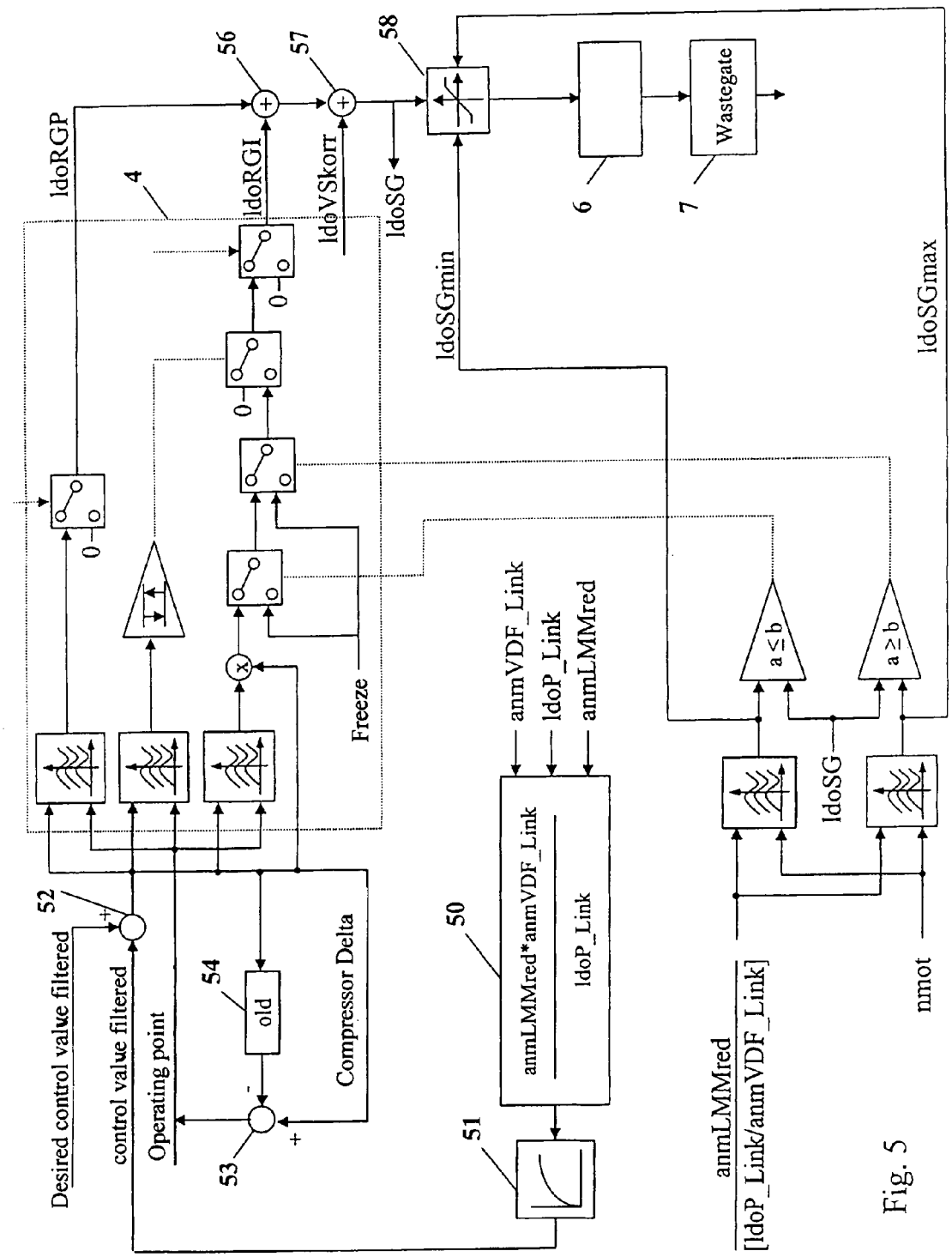
FIG. 5 shows an exemplary control arrangement for an operating point controller.

In FIG. 5, the application of this known control procedure to the operating point control according to the present invention is shown. The actual value of the control signal is determined in block 50 in which the reduced actual air mass anmLMMred is multiplied by the corrected intake air pressure in front of the compressor anmVDF_Link and subsequently is divided by the corrected charge air pressure after the compressor ldoP Link. Then, via a filter 51, the filtered control signal is determined and supplied to a summing block 52. To the summing block 52, furthermore the filtered desired control value is supplied, which is obtained as the result of the procedure according to FIG. 2. As output value, the summing block 52 provides the compressor-delta, that is, the deviation of the actual control value from the desired control value. In an additional summing block 53, an operating point gradient is determined from the actual compressor delta and the latest available value (block 54).

The values compressor-delta and operating point gradient are supplied as input values to the actual controller 4, preferably a PI controller, with the performance graph-based pilot control according to the patent application DE 100 62 350 A1. As output value, the controller 9 supplies the P-component idoRGP and the I-component IdoRGI. The two components are subsequently added in the summing block 56, and in a further summing block 57 added to the corrected performance graph-based pilot control value ldoVSkorr and the complete control output ldoSG is determined therefrom.

In a block 58 then, the controller output ldoSG is limited to admissible upper and lower limits ldoSGmax, ldoSGmin and subsequently supplied to a diagnosis block 6 and a waste gate control 7. These limits ldoSGmax, ldoSGmin are determined depending on the engine speed nmot and the operating value reduced actual air mass anmLMMred divided by the pressure ratio ldoP_Link/anmVDF_Link on the basis of suitable performance graphs.

Figure 6:
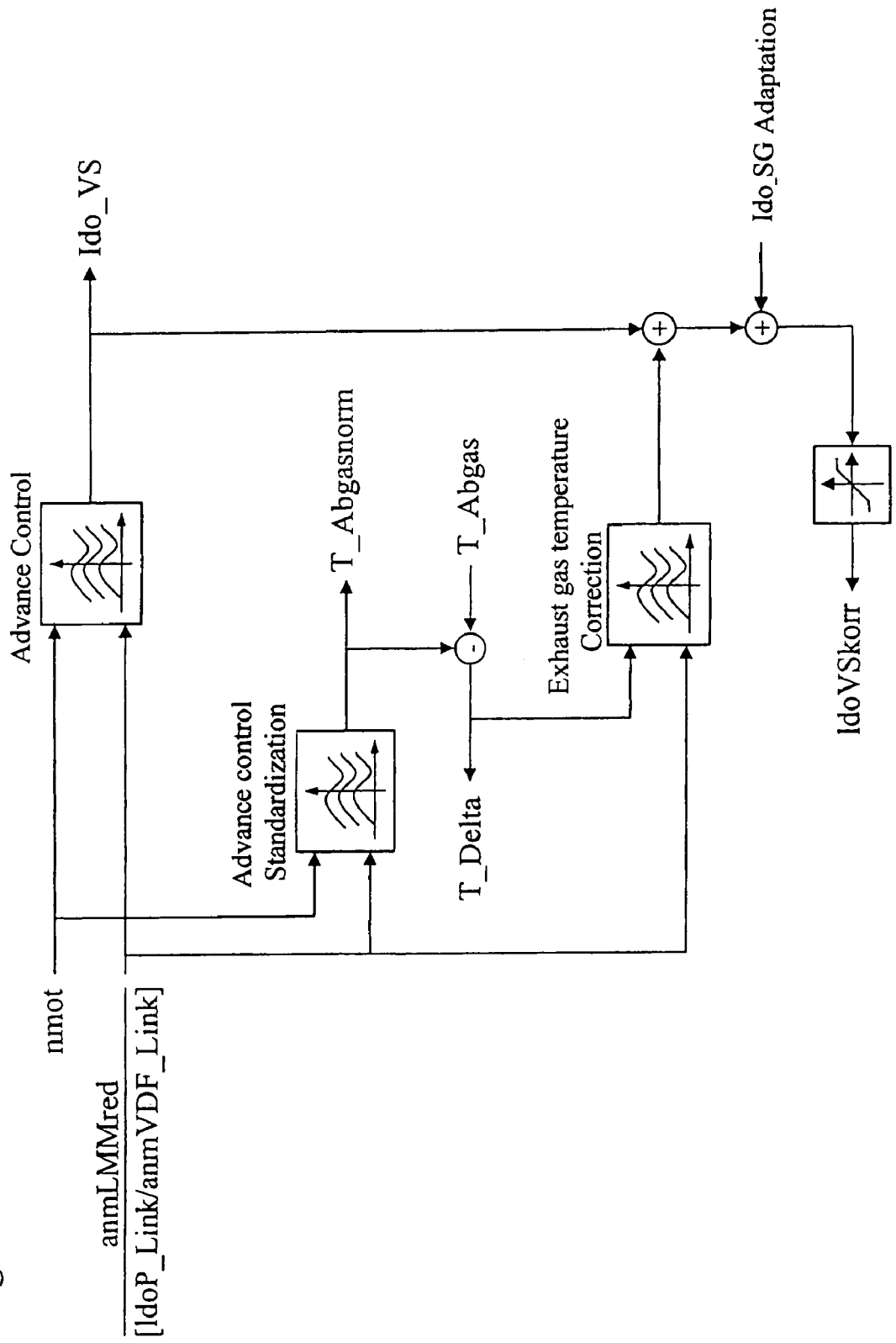
FIG. 6 shows an arrangement for a performance graph-based pilot control with exhaust gas temperature correction.
Figure 7:
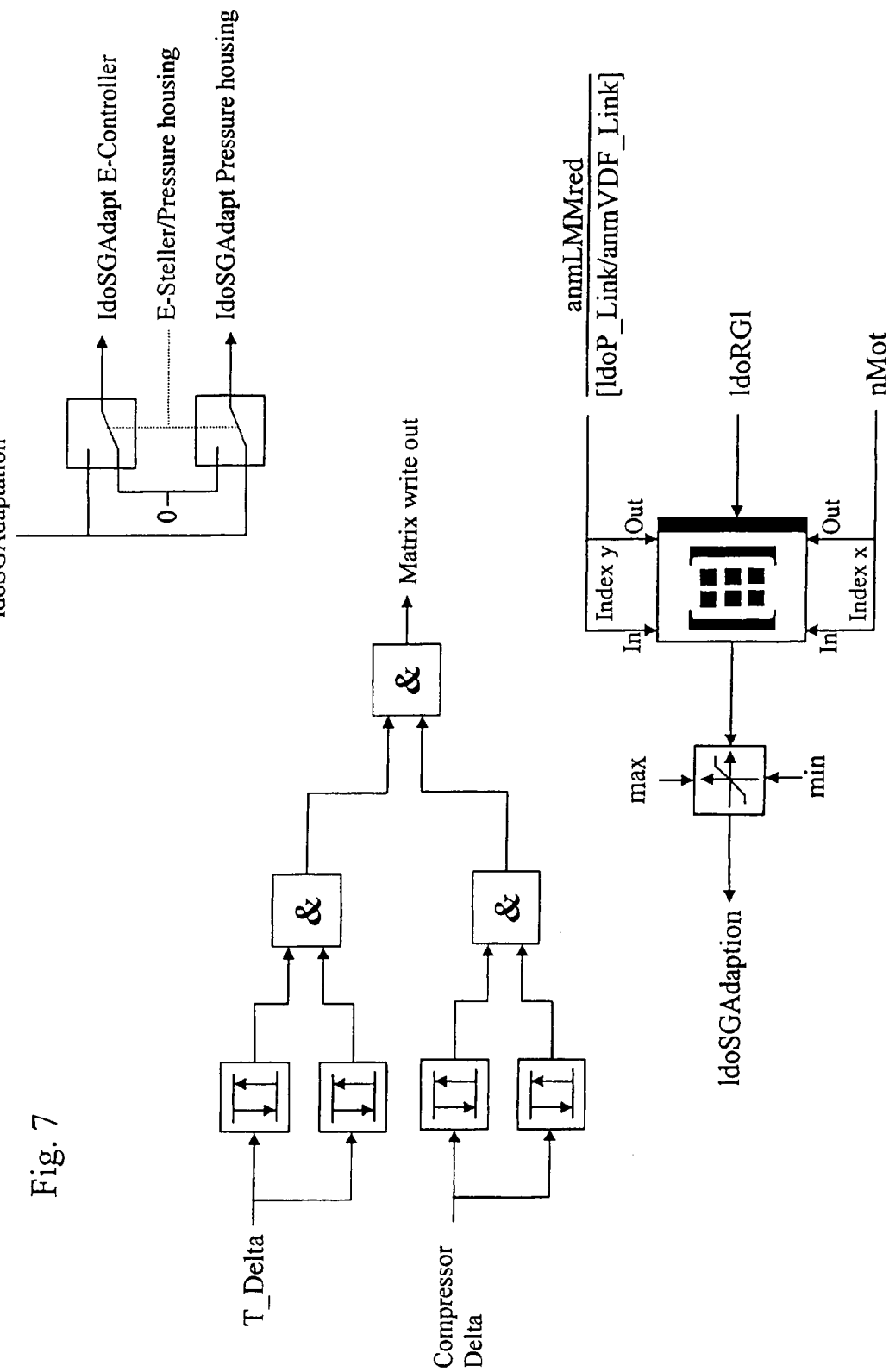
FIG. 7 shows an arrangement for the adaptation of the waste gate control.

With the performance graph-based pilot control under certain circumstances, an exhaust gas temperature correction may be advantageous. A corresponding controller structure is shown in FIG. 6. An adaptation of this control for the waste gate control is shown in FIG. 7. The waste gate control controls the power generated by the turbine and provided to the compressor.

Figure 8:
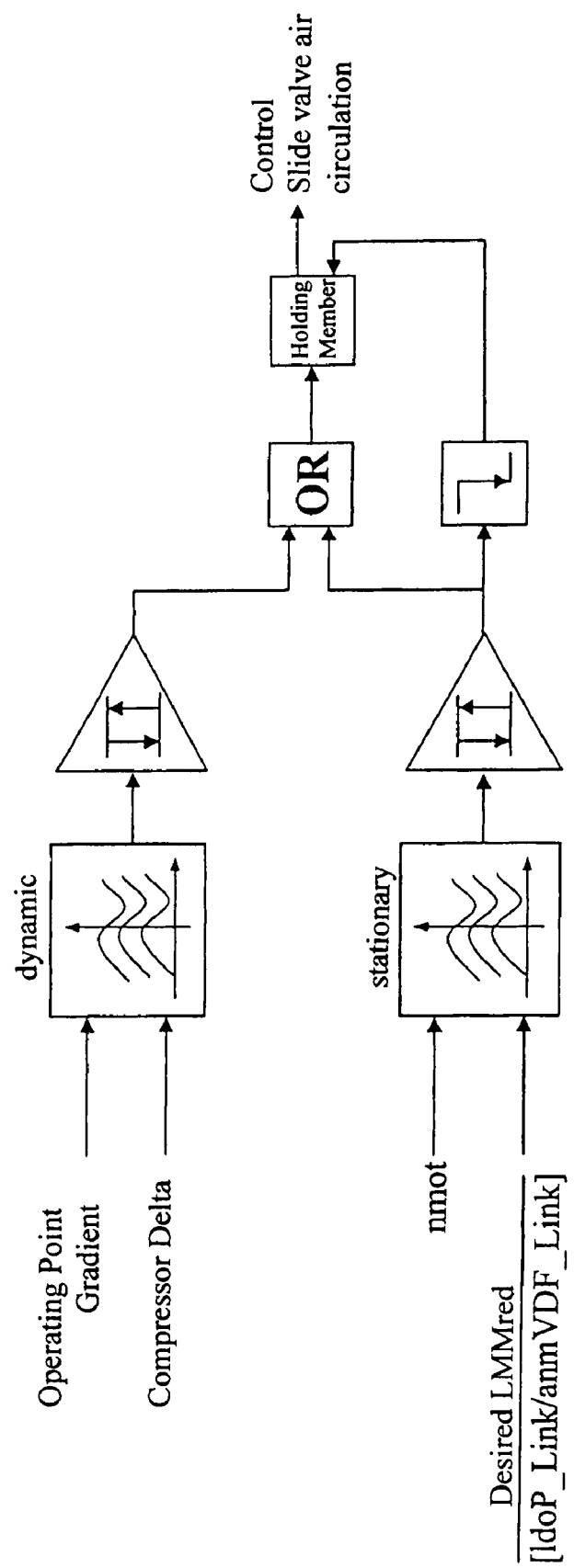
FIG. 8 shows an arrangement for a pump recognition or, respectively, for the control of the rotary slide valve.

The pump recognition or respectively the control for the slide circulated air valve is finally shown in FIG. 8. The operating behavior of a compressor is defined by a compressor performance graph (see FIG. 4), wherein the pressure ratio (that is, charge air pressure at the compressor output/intake air pressure at the compressor inlet) is represented by the air volume flow through the compressor. The usable performance graph area is limited toward the left (that, in the direction of smaller volume flows) by the so-called pumping limit. With excessively small volume flows, the flow detaches from the compressor guide vanes. The pumping procedure becomes instable thereby. The air then flows backward through compressor until a stable pressure ratio is again established. Then the pressure is again build up. The procedure is rapidly repeated. In this process, a noise is generated which is called the pumping noise.

The function shown in FIG. 8 serves to open a recirculating air slide valve during operation of the turbocharger in a pumping mode. The purpose is to rapidly reduce the high compression ratio so as to rapidly get out of the pumping area on the opposite side of the pumping limit, which also reduces the generation of noise.

Depending on the change of the operating point or, respectively, the operating point gradient and the compressor delta, the r-circulating air slide valve is opened with a high flow dynamic by way of a performance graph. Furthermore, the re-circulating air slide valve is opened depending on the engine speed nmot and the desired operating point control valve during quasi-stationary conditions based on an additional performance graph. All outputs of these two performance graphs must be disposed in this connection above a hysteresis limit (holding member) in order to control the re-circulating air slide valve. When all the performance graph output values are again below the pumping limit the re-circulating air slide valve is again closed.

In order to avoid pumping the pumping limit shown in FIG. 4 also enters the determination of the desired air mass limit IdolMmmax shown in FIG. 3.

In the shown embodiments, the operating point control is described in connection with a V-type internal combustion engine. With the exception of the cylinder bank compensation, the operating point control however is also applicable to other internal combustion engines. Furthermore, at various points correction values are determined. With these corrections, the result of the operating point control is improved. Such correction models are particularly then advantageous if the available sensors are not provided at the positions which are not most advantageous for the control of the engine operating point. For example, pressure sensors should be arranged directly at the compressor inlet and at the compressor outlet. Since this however is often for construction reasons not possible, the influences of a different location are preferably omitted by corresponding correction models. However, the teachings of the invention are not limited to operating point controls which include correction procedures.

LISTINGS OF REFERENCE DESIGNATION

| | |
|---|---|
| anmADF | Atmospheric Pressure |
| anmAT1 | Intake air temperature |
| anmLMMred | Reduced actual air mass |
| anmLTF | Charge air temperature after the charge air cooler after the throttle valve |
| anmVDF_Linkli | Corrected intake air pressure before the compressor left bank (with pressure loss) |
| anmVDF_Linkre | Corrected intake air pressure before the compressor right bank (with pressure loss) |
| ldmLMSoll_li | Air mass, desired value, left bank |
| ldmLMSoll_re | Air mass, desired value, right bank |
| ldmM_BASE = | (ldwPlref/anmVDF) * $\sqrt{}$(anmAT1/ldwT1ref) (reference pressure/corrected intake air pressure before the compressor) * $\sqrt{}$(intake air temperature/reference temperature) |
| ldmM_BASEli | Weighting factor for the calculation of the reduced air mass, left bank |
| ldmM_BASEre | Weighting factor for the calculation of the reduced air mass, right bank |
| ldmP_Llin | Actual charge air pressure |
| ldoRGI | I-component controller |
| ldoRGP | P-component controller |
| ldoLMmmaxli | Desired air mass value limit, left bank |
| ldoLMmmaxre | Desired air mass value limit, right bank |
| ldoP_Linkli | Corrected charge air pressure after the compressor, left bank (with pressure loss) |
| ldoP_Linkre | Corrected charge air pressure after the compressor right bank (with pressure loss) |
| ldoSG | Controller output (P-/I-components and performanc graph-based pilot control |
| ldoSGmax | Maximum value controller output |
| ldoSGmin | Minimum value controller output |
| ldoSGAdaptation | Adaptation value for the controller output |
| Ldo_VS | Performance graph-based pilot control |
| ldoVSkorr | Corrected performance graph-based pilot control |
| mdks_w | Desired air mass flow - overall |
| msdks_wli | Desired air mass flow - left bank |
| mshfmm_w | Filtered actual air mass |
| mshfmuf_wli | raw value, actual air mass flow - left bank |
| mshmuf_wre | raw value actual air mass flow, right bank |
| nmot | Speed |
| Desired control value | Filtered operating point - desired control value |
| Filtered left | Left |
| Desired control value | Filtered desired operating point control value |
| Filtered right | Right |
| T_exhaust gas | Actual exhaust gas temperature |
| T_exhaust gas normalized | Normalized exhaust gas temperature - actual exhaust gas temperature |
| T_Delta | Normalized exhaust gas temperature - actual exhaust gas temperature |
| Compressor delta | Operating point change |

What is claimed is:

1. A method of controlling an exhaust gas turbocharger for an internal combustion engine with cylinder banks charged by a compressor wherein as a guide value for the control an operating point of the compressor is used, said method comprising the steps of: separately controlling the operation of each cylinder bank of the internal combustion engine, dividing a predetermined desired air mass flow (msdks_w) by the number of cylinder banks so as to assign to each cylinder bank an equal amount/quantity of the desired air mass, limiting the desired air masses (ldoLMSoll) for the individual cylinder banks and, if the air mass flow to any one of the cylinder banks is insufficient, and supplying air from the other cylinder bank or banks to the one cylinder bank via a compensation arrangement so that the air mass flow is equal for all cylinder banks.

2. A method according to claim 1, wherein, as the guide value for controlling, a quotient of the air mass flow and the pressure ratio at the compressor is used.

3. A method according to claim 1, wherein an operating point for the control of the exhaust gas turbocharger is determined from a compressor performance graph on the basis of a given ingestion line of the internal combustion engine.

4. A method according to claim 1, wherein a P1 controller with a performance graph-based pilot control is used for controlling the exhaust gas turbocharger.

5. A method according to claim 1, wherein the internal combustion engine includes two cylinder banks, and the desired air mass (ldoLMSoll) for the two cylinder banks is limited in each case to a manually admissible desired air mass value.

* * * * *